(12) United States Patent
Hulbert et al.

(10) Patent No.: US 10,459,426 B2
(45) Date of Patent: Oct. 29, 2019

(54) ASSIGNMENT OF SENSORS TO MACHINE PARTS

(71) Applicant: Siemens Aktiengesellschaft, München (DE)

(72) Inventors: Anthony Peter Hulbert, Bassett Green (GB); Martin Kiesel, Poxdorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 303 days.

(21) Appl. No.: 15/066,804

(22) Filed: Mar. 10, 2016

(65) Prior Publication Data

US 2016/0266571 A1 Sep. 15, 2016

(30) Foreign Application Priority Data

Mar. 11, 2015 (EP) ..................................... 15158617

(51) Int. Cl.
| G05B 19/406 | (2006.01) |
| G05B 19/042 | (2006.01) |
| H04L 29/08 | (2006.01) |

(52) U.S. Cl.
CPC ....... *G05B 19/406* (2013.01); *G05B 19/0428* (2013.01); *H04L 67/12* (2013.01); *G05B 2219/39155* (2013.01); *G05B 2219/40601* (2013.01)

(58) Field of Classification Search
None
See application file for complete search history.

(56) References Cited

U.S. PATENT DOCUMENTS

| 8,713,229 | B2 | 4/2014 | Brux et al. |
| 2003/0188157 | A1 | 10/2003 | Birzer et al. |
| 2004/0030564 | A1 | 2/2004 | Hartinger et al. |
| 2004/0105398 | A1 | 6/2004 | Franke et al. |
| 2006/0206291 | A1 | 9/2006 | Bash et al. |
| 2006/0229739 | A1* | 10/2006 | Morikawa ............ G05B 13/027 700/19 |
| 2007/0043675 | A1 | 2/2007 | Birzer et al. |

(Continued)

FOREIGN PATENT DOCUMENTS

| EP | 1587162 A1 | 10/2005 |
| EP | 1752263 A1 | 2/2007 |

*Primary Examiner* — Reema Patel
*Assistant Examiner* — Steven M Christopher
(74) *Attorney, Agent, or Firm* — Henry M. Feiereisen LLC

(57) ABSTRACT

A sensor assignment device includes a movement instruction generator for generating and submitting a movement instruction to a distinct one of a plurality of actuators to move a distinct one of a plurality of machine parts, a sensor data receiver for receiving sensor data acquired by a subset of a plurality of sensors, a degree of correlation determiner for determining sensor-specific degrees of correlation between the detected sensor data and the movement instruction, and a sensor assigner for assigning those sensors to the distinct machine part whose sensor-specific degrees of correlation exceed a predetermined threshold or a multiple-step fashion as refinement in case of insufficiently reliable map of affiliations between sensors and machine parts. The received sensor data is used to influence the movement instruction.

10 Claims, 3 Drawing Sheets

(56) References Cited

U.S. PATENT DOCUMENTS

| | | | |
|---|---|---|---|
| 2007/0146118 A1* | 6/2007 | Rodriguez | G05B 19/042 340/5.71 |
| 2008/0190166 A1* | 8/2008 | Hahn | G05B 19/39 73/1.01 |
| 2012/0303853 A1 | 11/2012 | Brux et al. | |
| 2014/0012415 A1 | 1/2014 | Benaim et al. | |
| 2017/0268695 A1* | 9/2017 | Turner | F16K 37/0083 |

* cited by examiner

ASSIGNMENT OF SENSORS TO MACHINE PARTS

CROSS-REFERENCES TO RELATED APPLICATIONS

This application claims the priority of European Patent Application, Serial No. 15158617.9, filed Mar. 11, 2015, pursuant to 35 U.S.C. 119(a)-(d), the disclosure of which is incorporated herein by reference in its entirety as if fully set forth herein.

BACKGROUND OF THE INVENTION

The present invention relates to a sensor assignment device having a sensor assigner prepared for assigning one or more sensors to a distinct one of a plurality of machine parts moveable by actuators. The present invention also relates to a method for assigning a sensor to one of a plurality of machine parts moveable by actuators.

The following discussion of related art is provided to assist the reader in understanding the advantages of the invention, and is not to be construed as an admission that this related art is prior art to this invention.

Existing wired industrial control systems such as Profinet typically include a controller, one or more actuators and one or more sensors. Usually each actuator has at least one sensor associated with it in order to facilitate closed-loop feedback control. Typically, the setup of a conventional industrial control system is hard-wired. Then, association of sensors to actuators is generally straightforward and can be implicit in a wired serial bus architecture that is used to connect all the devices (whether actuator or sensor) to the controller. In case of wireless industrial control association of sensors to actuators (or vice versa) is less simple. Generally, each of the actuators and sensors will have a unique identification code. The identifications codes can be programmed into the controller and given the necessary association (pairing) there. For example, process data from a sensor having an identification code x may be routed to an actuator having an identification code y. However, programming this association is potentially error-prone.

It would therefore be desirable and advantageous to provide an improved sensor assignment device and a corresponding method to obviate prior art shortcomings and to enhance reliability of accuracy of the assignments (pairing information) between sensors and actuators.

SUMMARY OF THE INVENTION

According to one aspect of the present invention, a sensor assignment device includes a movement instruction generator configured to generate and submit a movement instruction to a distinct one of a plurality of actuators to move a distinct one of a plurality of machine parts, a sensor data receiver configured to receive sensor data acquired by a subset of a plurality of sensors, a degree of correlation determiner configured to determine sensor-specific degrees of correlation between the detected sensor data and the movement instruction, and a sensor assigner configured to assign those sensors to the distinct one of the plurality of machine parts whose sensor-specific degrees of correlation exceed a predetermined threshold, or a multiple-step fashion as refinement in case of insufficiently reliable map of affiliations between sensors and machine parts, whereas the received sensor data is used to influence the movement instruction.

The degree of correlation may be designated as a degree of consistency. Here and in the following, a subset may be a proper subset or an improper subset of its basic set. Apart from this, a subset may be a single element of the basic set (i.e. a one-element set). It should be noted that actuators can be deemed as machine parts. However, not every machine part is an actuator.

According to another aspect of the present invention, a method for assigning a sensor to a machine part moveable by an actuator includes transmitting a movement instruction to a distinct one of a plurality of actuators to move a distinct one of a plurality of machine parts, acquiring sensor data by a subset of a plurality of sensors, determining sensor-specific degrees of correlation between the acquired sensor data and the movement instruction, and assigning those sensors to the distinct machine part whose sensor-specific degrees of correlation exceed a predetermined threshold.

A method in accordance with the present invention thus involves in a first step a movement instruction is transmitted to a distinct one of a plurality of actuators to move a distinct one of a plurality of machine parts. In a second step sensor data are acquired by a subset of a plurality of sensors. In a third step sensor-specific degrees of correlation are determined between the acquired sensor data and the movement instruction. In a fourth step those sensors are assigned to the distinct machine part whose sensor-specific degrees of correlation exceed a predetermined threshold.

Steps one to three can be refined with a multiple-step fashion in case of insufficiently reliable map of affiliations between sensors and machine parts, whereas the received sensor data is used to influence the movement instruction.

One concept of the present invention can be seen in that the sensor assigner is (operably) prepared for assigning those sensors to the distinct machine part whose sensor-specific degrees of correlation exceed a predetermined threshold. Further, it is proposed that a degree of correlation determiner is provided for determining sensor-specific degrees of correlation between the detected sensor data and the movement instruction. Typically, both the degree of correlation determiner and the sensor assigner are electronic devices.

Moreover, a control method is provided that allows the sensor assigner to learn or check which sensor is associated with which machine part. This method may be performed during a set-up phase of a machinery, of a machine, of a machine part or after installation, replacement of one or more sensors and/or of one or more actuators. Advantageously, the sensor (among the existing or responding sensors) whose data have the highest consistency with the known pattern of movements for the machine or machine part becomes assigned to that machine or machine part. An alternative or additional criteria may be that the consistency of the sensor data with the known pattern of movements exceeds a predetermined threshold level. This feature may avoid a situation wherein a next-best sensor is assigned when the correct sensor has failed, even though the sensor performance (with respect to the considered machine or machine part) of the next-best sensor is poor. Optionally, each described embodiment may be refined by transmitting and/or processing data to and/or from only those sensors that have not yet been assigned to any machine part or to any actually observed machine part. Thereby, a reduction of processing and/or of transmission requirements can be achieved.

A further refinement of the concept is to apply the concept (the learning strategy) in a multiple-step fashion as follows. The operations described above are performed in a first step employing movement instructions for a first pattern of movements. Upon completion of the first step, sensor data is processed from a candidate sensor. This processed sensor data is employed for defining movement instructions for a second pattern of movements Mm taking into account said sensor data from the candidate sensor. By the second and optional further steps an identification and/or a role and/or a location information and/or an orientation information of one or more sensors can be refined and narrowed down step-by-step, This may be repeated until a sufficiently reliable map of affiliations between sensors and machine parts is established.

According to another advantageous feature of the present invention, the degree of correlation determiner can be configured to detect a temporal correlation between the submission of the movement instruction and the sensor data acquired by the subset of sensors. A determination and evaluation of a temporal correlation may be the most effective and easiest to implement approach. When only one actuator at a time is instructed to perform a movement it is clear that only that sensor or only those sensors (among the existing sensors) can be deemed as correlated to only those machine parts which are drivable by the instructed actuator, at all.

According to another advantageous feature of the present invention, the movement instruction generator can be configured to generate a movement instruction for the distinct one of the plurality of actuators to drive the distinct machine part such as to perform at least two different movements. The sensor assigner may instruct an actuator to drive a machine or a machine part performing a pattern of movements. Whilst these movements are being performed data from sensors are observed. Advantageously, actuator-specific or machine-part-specific patterns of movements may be designed or selected comprising patterns of movements which can only be performed by only a distinct one or a distinct subset of actuators or machine parts, thereby characterizing a position or movement of a sensor when detected by a sensor. By this measure a discriminatory power of potential assignments can be improved.

Alternatively or in addition, the sensor assignment device may be configured to perform for a same actuator a comparison between a pair of deviations, wherein a first of both deviations is a deviation of a first reported movement from a first commanded movement (movement instruction) and wherein the other of both deviations is a deviation of a second reported movement from a second commanded movement (movement instruction). This may also be considered as deriving a type of correlation. When the first and second commanded movements are movements of a same (relative) stroke or of same (relative) angular deflection, the first and second movements may differ in their start positions and/or in their directions of movement. In this case absolute values of first and second deviations may be compared. When the first and second commanded movements are strokes or angular deflections of different absolute value the values of both deviations to be compared for performing a compatibility check may be relative (e.g. percentage) values. A difference between both deviations (whatever absolute or relative) may be calculated and compared to a predetermined threshold (of same kind) for obtaining an assessment whether a sensor assignment is plausible. In addition or alternatively, a plausibility checker may employ the same method for a plausibility check.

Alternatively or in addition, the degree of correlation determiner can be configured to detect a correlation between a requested movement pattern and an actual movement pattern actually performed by the distinct machine part and detected by the subset of sensors, said requested movement pattern being predetermined by one movement instruction or by a sequence of movement instructions.

According to another advantageous feature of the present invention, the degree of correlation determiner can be configured to consider a type information when determining the degree of correlation, with the type information defining a type of at least one of the sensors of the subset of sensors. There may be a variety of types of sensors (sensor types), wherein not each type of sensor is applicable to each kind of machine or machine part. At least a subset of sensors may have a type number each indicating a type of measurement it can perform (e.g. longitudinal position, angular position, acceleration, compass direction, inclination, distance from a reference object). Then, the examination of sensor data can be limited to only those sensors having a type number appropriate for sensing the machine part of interest.

According to another advantageous feature of the present invention, the sensor assignment device can be configured to broadcast a same movement instruction to all or to a subset of the plurality of actuators. This concept may help to accelerate sensor assignments, in particular when sensor data caused by the instructed movement allows conclusions which of the actuators led to the sensor data observed. For elucidating this concept the following simple example is given. When, for example, there were only sensors providing three-dimensional positions with reference to a common fixed reference system (like GPS receivers), the positional data of such sensors reveals absolute sensor positions within the machinery (supposed there are no common positional spaces of sensor positions, i.e. that no sensor can assume a position that one of the other sensors can assume).

According to another advantageous feature of the present invention, the sensor assignment device can be configured to broadcast movement instructions to different pluralities of actuators for narrowing down correlations between sensors and machine parts. For example, a Karnaugh map of assignments of sensor assignment to machine parts can be filled, when in a first step about a half of all existing actuators are instructed, and when in a second step a half of the actuators thereof are instructed, and so on. Alternatively, or in addition, this search concept can be employed for performing a binary search of one or more machine-part-specific sensors.

According to another advantageous feature of the present invention, the sensor assignment device can include a plausibility checker for checking a plausibility of sensor assignments. In order to avoid a misoperation of the machinery, a negative result of a plausibility check may be employed for generating a warning and/or an error message or for disabling a sensor assignment. A positive result of the plausibility check may be employed for enabling a sensor assignment.

According to another advantageous feature of the present invention, the plausibility checker can be configured to perform and evaluate a cross-correlation. In this embodiment some knowledge about the structure of the machinery may be utilized. When for example, each of the sensors is combined with an own actuator and when each of the sensors is configured to measure only an angular movement or a longitudinal movement of its actuator, a cross-correlation between correctly assigned pairs of sensors and machine parts should be almost Zero.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
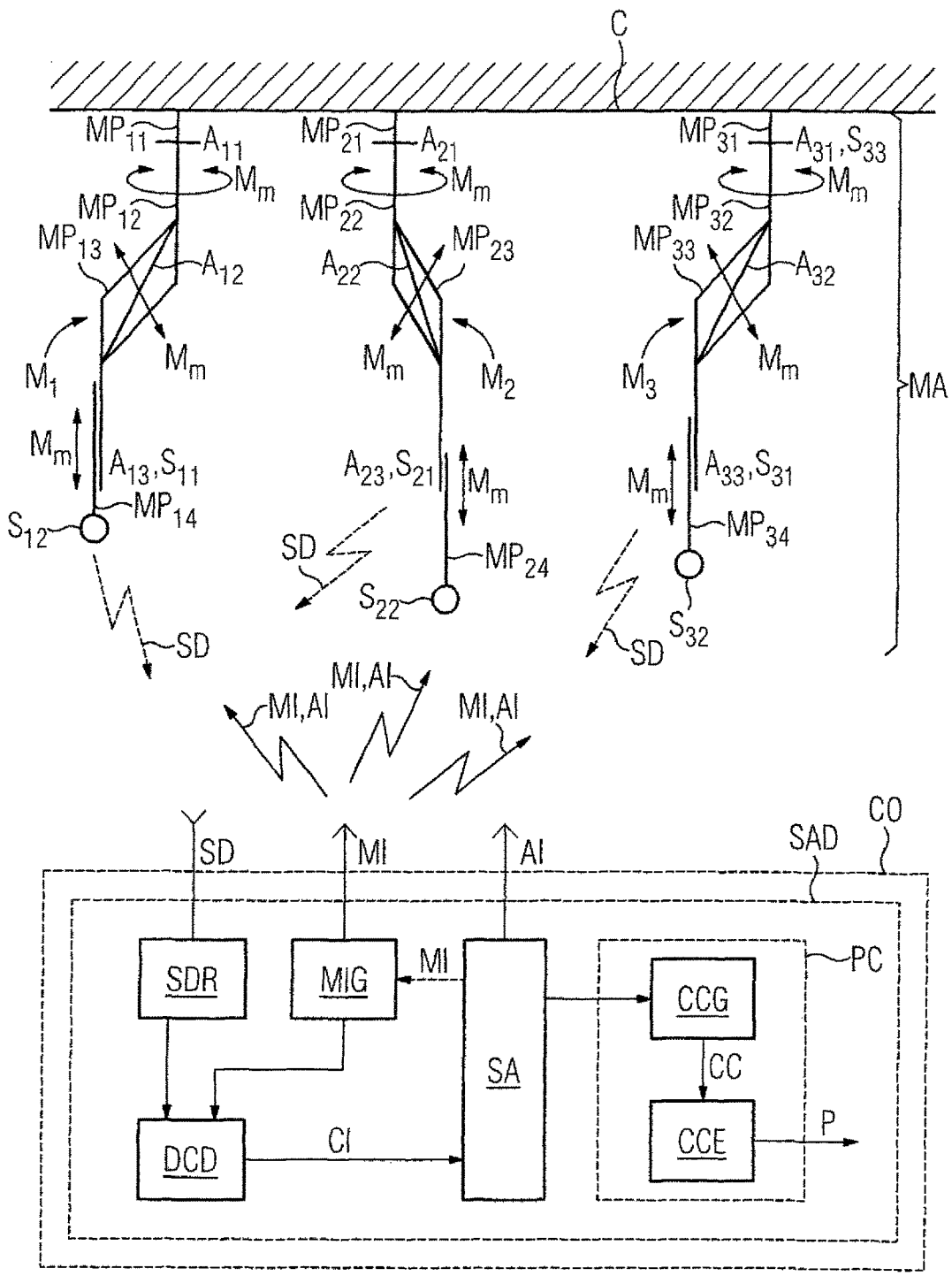
FIG. 1 a schematic illustration of an arrangement of a ceiling-mounted machinery and of a sensor assignment device.

Throughout all the figures, same or corresponding elements may generally be indicated by same reference numerals, These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an arrangement of a ceiling-mounted machinery MA and of a controller CO for the machinery MA, the controller CO having a sensor assignment device SAD. The machinery MA comprises a set of machines $M_1$, $M_2$, $M_3$. Each machine $M_1$, $M_2$, $M_3$ comprises a set of machine parts $MP_j$. In the example of FIG. 1, a first machine part $MP_{11}$ of machine $M_1$ serves as a fastening to a ceiling C. A second machine part $M_{12}$ of this machine $M_1$ is a rotating part. A third machine part $M_{13}$ of this machine $M_1$ is a four-bar mechanism. A fourth machine part $M_{14}$ of this machine $M_1$ is a telescopic or pushrod guide system, A first actuator $A_{11}$ is for rotating the second machine part $M_{12}$ relatively to the first machine part $M_{11}$. The second actuator $A_{12}$ is for lifting and lowering a bar of the four-bar mechanism. The third actuator $A_{13}$ is for lifting and lowering a pushrod of the pushrod guide system. In the example of FIG. 1, the other two machines $M_2$, $M_3$ have corresponding components $A_{21}$, $A_{22}$, $A_{23}$, $A_{31}$, $A_{32}$, $A_{33}$. Each of the machines $M_1$, $M_2$, $M_3$ has a first sensor $S_{11}$, $S_{21}$, $S_{31}$ at its pushrod guide system $MP_{14}$, $MP_{24}$, $MP_{34}$ and a second sensor $S_{12}$, $S_{22}$, $S_{32}$ at a tip of its pushrod. In addition, the third machine $M_3$ has a third sensor $S_{33}$ at the pivot bearing.

The sensor assignment device SAD comprises a sensor assigner SA, a movement instruction generator MIG, a sensor data receiver SDR, and a degree of correlation determiner DCD. The movement instruction generator MIG generates and submits movement instructions MI to distinct ones of actuators $A_k$ (k symbolizes a running index of the actuators). The movement instructions MI may be transmitted on wireless and/or on wireline transmission paths, The actuators $A_k$ receive the movement instructions $M_m$ and drive associated machine parts $MP_j$ (m symbolizes a running index of locations and/or of types of movements; j symbolizes a running index of machine parts). As a result, the machine parts $MP_j$ perform movements $M_m$ in accordance with the movement instructions MI. As a consequence of the movements $M_m$ sensors $S_i$ located at the machine parts $MP_j$ acquire sensor data SD comprising information on the movement $M_m$ performed by the associated machine part $MP_j$. The acquired sensor data SD may be transmitted to the sensor assignment device SAD on wireless and/or on wireline transmission paths. The movement instructions MI and the received sensor data SD are fed to the degree of correlation determiner DCD. Starting from this information the degree of correlation determiner DCD calculates a correlation degree CD between movement instructions MI and the received sensor data SD. The correlation degree CD may describe a temporal and/or of a pattern-type correlation between said movement instructions MI and said received sensor data SD.

The degree of correlation determiner DCD provides correlation information CI to the sensor assigner SA. The sensor assigner SA assigns those sensors $S_i$ to those machine parts $MP_j$ where the pair between a sensor $S_i$ and a machine part $MP_j$ has a correlation degree CD exceeding a predetermined threshold.

Optionally, the sensor assignment device SAD may comprise a plausibility checker PC for checking degrees of correlation DC for plausibility. In a more particular embodiment, the plausibility checker PC may comprise a cross-correlation generator CCG for generating cross-correlations CC and a cross-correlation evaluator CCE for determining a plausibility P of cross-correlations CC.

Figure 2:
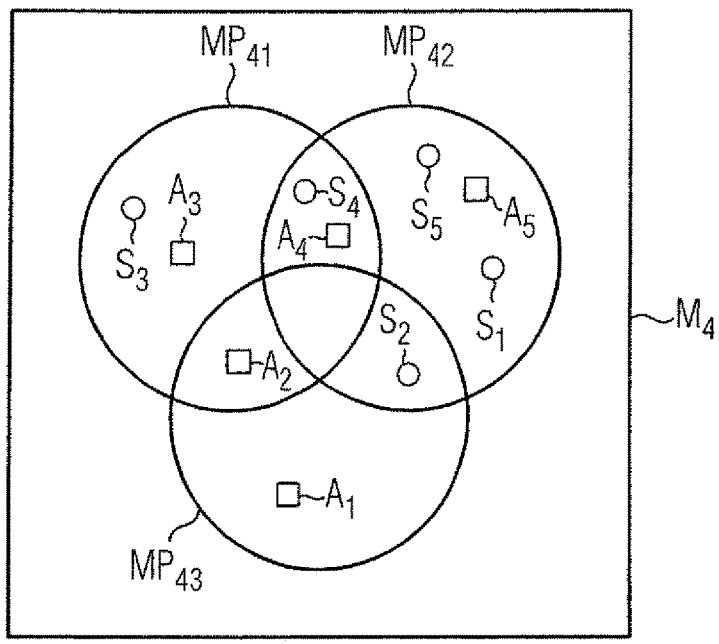
FIG. 2 a schematic diagram of an affiliation of machine parts to a machine, and of an affiliation of actuators and sensors to machine parts.

The set diagram of FIG. 2 shows an affiliation of machine parts $MR_{41}$, $MP_{42}$, $MP_{43}$ to a machine $M_4$ which may be added to and operated in the arrangement of FIG. 1. The set diagram shows an example of individual affiliations of actuators $A_k$ and sensors $S_i$ to machine parts $MP_j$. Here, the actuator $A_4$ drives (at least indirectly) as well machine part $MP_{41}$ as well as machine part $MP_{42}$. The actuator $A_2$ drives (at least indirectly) as well machine part $MP_{41}$ as well as machine part $MP_{43}$. The sensor $S_4$ is driven (at least indirectly) as well by machine part $MP_{41}$ as well as by machine part $MP_{42}$. The actuator $S_2$ is driven (at least indirectly) as well by machine part $MP_{42}$ as well as by machine part $MP_{43}$.

Figure 3:
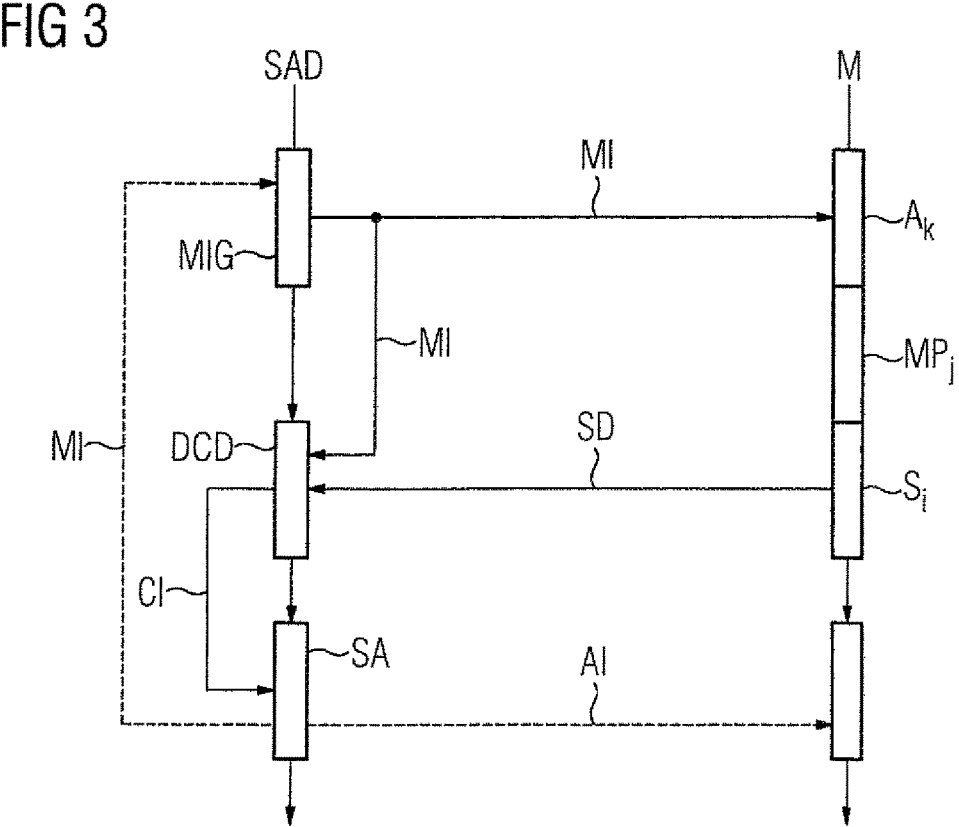
FIG. 3 a schematic data flow from a sensor assignment device to an actuator controlling a movement of a machine part and from a sensor to the sensor assignment device, wherein the sensor acquires sensor data in dependence on the movement of the machine part.

FIG. 3 shows schematically data flows MI, SD, Al between a sensor assignment device SAD to actuators $A_k$ controlling movements $M_m$ of machine parts MR and from sensors $S_i$ to the sensor assignment device SAD, wherein the sensors $S_i$ are acquiring sensor data SD in dependence on the movements $M_m$ of the machine parts $MP_j$.

A controller CO of the machinery MA is connected in a forward direction to actuators $A_k$ via a communications medium. The communications medium may, for example, be a wired star network, a wired serial bus, or a wireless medium. The controller CO is also connected in a backward direction to sensors $S_i$ via one of the mentioned communications media. In the following it is supposed that the affiliation of at least one of the sensors $S_i$ to the corresponding moveable machine part $MP_j$ is unknown at start-up of the machinery MA. On the other hand, it is supposed that the controller CO has all necessary information and means for instructing and causing at least one of the actuators $A_k$ to drive a movement Mm of one of the machine parts $MP_j$. During the movements Mm the sensors SD record sensor data SD. Depending on a consistency of received sensor data SD, the sensor assigner SA associates at least one of the sensors $S_i$ to at least one of the machine parts $MP_j$. When however, the received sensor data SD is not adequately consistent, the sensor assigner SA does not associate any of the sensors to any of the machine parts $MP_j$.

A further refinement of the concept is to apply the concept (the learning strategy) in a multiple-step fashion as follows. The operations described above are performed in a first step employing movement instructions Ml for a first pattern of movements. Upon completion of the first step, sensor data SD is processed from a candidate sensor $S_i$. This processed sensor data SD is employed for defining movement instructions MI for a second pattern of movements Mm taking into account the sensor data SD from the candidate sensor $S_i$. By the second and optional further steps an identification and/or a role and/or a location information and/or an orientation information of one or more sensors $S_i$ can be refined and narrowed down step-by-step. This may be repeated until a sufficiently reliable map of affiliations between sensors $S_i$ and machine parts $MP_j$ is established.

Ideally, at a start of a set-up phase all relevant actuators $A_k$ are inactive. Then, each actuator $A_k$ is instructed in turn to follow its pattern of movements $M_m$. Alternatively, the assignment of sensors $S_i$ to machine parts $MP_j$ can be performed when most of the machine parts $MP_j$ are active (even machine parts $MP_j$ having the unassigned sensor $S_i$ may be already active). Supposed that all existing sensors $S_i$ are already assigned, the assignment process becomes relatively trivial when only one pair of machine part $MP_j$ and sensor Si is added at a time. The reliability of the determination of assignments can be enhanced by completing the learning steps for more than one actuator $A_k$ before making any final assignment decision. This can be done for all actuators $A_k$ that expect a same type number (or a common range of type number). In this case globally optimal decisions can be made, and inconsistencies between assignments can be identified. For example, when a single sensor $S_i$ shall be assigned to two different actuators $A_k$ belonging to two different machines this may indicate a consistency problem.

Now, the suggested assignment method is elucidated by following examples:

In the case of a linear stepper motor actuator $A_k$, the sensor $S_i$ may be a linear position sensor. The pattern of movement $M_m$ is then a motion over a specified distance. The sensor data SD can be examined to find a movement $M_m$ over a same distance in the same direction. In a multiple-step approach, the fractional error for the first step can be calculated and used for predicting a fractional error of the second step. For example, when the applied movement $M_m$ was 1 cm, but the reported movement $M_m$ was 0.8 cm, for a further applied movement $M_m$ of 1 cm, a reported movement $M_m$, of 0.8 cm fulfils a consistent expectation.

In the case of a three-dimensional actuator $A_k$ (for example for moving a robot arm) a three axis sensor $S_i$ may be provided. Then, the pattern of movement $M_m$ may be a sequence of movements $M_m$ in each of three dimensions x, y, z. For example, when we note the three mutually normal dimensions as x, y and z with units of 1 cm then the movements $M_m$ can be x=x+1, x=x−1, y=y+1, y=y−1, z=1, z=z−1. The correct three axis sensor $S_i$ reports these three successive forward-backward movements $M_m$. In this case there may be some rotational transformation and a scaling error between the applied and the reported movements $M_m$. Here, the angular transformation needed to maximise consistency between the applied and the reported movements $M_m$ can be computed. Too large angle differences may suggest either that a wrong sensor $S_i$ is being observed or (which may be more likely) that the sensor $S_i$ has been incorrectly mounted. In either event valuable information is obtained.

In the case of a rotating platform the operations can be essentially the same as those for the linear stepper motor actuator $A_k$ except that the values applied and reported are angles rather than absolute distances.

The suggested sensor assignment concept has the benefit that a requirement for a manual set up of associations between sensors $S_i$ and machine parts $MP_j$ is removed. Thereby, expensive work-time for setting up a machinery MA or replacing a sensor $S_i$ can be reduced. Configuration errors can be avoided, and implicit self-tests of the configuration can be performed.

Figure 4:
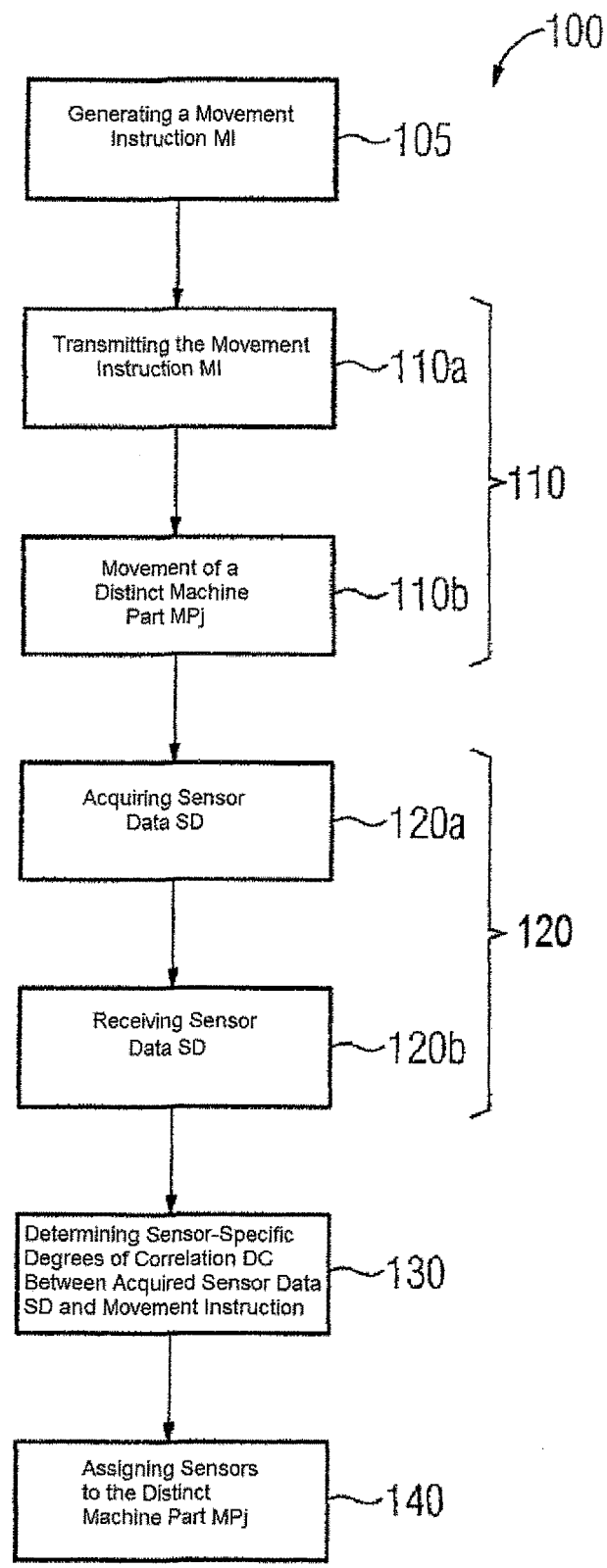
FIG. 4 a schematic flow diagram of a method for assigning a sensor to a machine part moveable by an actuator.

FIG. 4 shows a method 100 for assigning a sensor $S_i$ to a machine part $MP_j$ moveable by an actuator $A_k$. The method 100 comprises following steps. In a first step 110 a movement instruction MI is transmitted to a distinct one of a plurality of actuators $A_k$ (step 110a) to move a distinct one of a plurality of machine parts $MP_j$ (step 110b). In a second step 120 sensor data SD are acquired by a subset of a plurality of sensors $S_i$ (step 120a). In a third step 130 sensor-specific degrees of correlation DC between said acquired sensor data SD and the movement instruction MI is determined. In a fourth step 140 those sensors $S_i$ are assigned to the distinct machine part $MP_j$ whose sensor-specific degrees of correlation DC exceed a predetermined threshold.

The suggested sensor assignment device SAD has a movement instruction generator MIG, a sensor data receiver SDR, a degree of correlation determiner DCD, and a sensor assigner SA. The movement instruction generator MIG is prepared for generating 105 and submitting 110a a movement instruction MI to a distinct one of a plurality of actuators $A_k$ to move a distinct one of a plurality of machine parts $MP_j$. The sensor data receiver SDR is prepared for receiving (step 120b) sensor data SD acquired in step 120a by a subset of a plurality of sensors $S_i$. The degree of correlation determiner DCD is prepared for determining a sensor-specific degrees of correlation between said detected sensor data SD and the movement instruction MI. The sensor assigner SA is prepared for assigning those sensors $S_i$ to the distinct machine part $MP_j$ whose sensor-specific degrees of correlation DC exceed a predetermined threshold.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A sensor assignment device, comprising:
    a movement instruction generator configured to generate and submit a movement instruction to a distinct one of a plurality of actuators to move a distinct one of a plurality of machine parts;
    a sensor data receiver configured to receive sensor data based on movements of machine parts of three ceiling-mounted machines, acquired by a subset of a plurality of sensors, with each machine having a pushrod as a machine part;
    a degree of correlation determiner configured to determine sensor-specific degrees of correlation between the detected sensor data and the movement instruction; and a sensor assigner which, when obtaining a reliable map of affiliations between sensors and machine parts, assigns those sensors to the distinct one of the plurality of machine parts whose sensor-specific degrees of correlation exceed a predetermined threshold, and which, when obtaining an insufficiently reliable map of affiliations between sensors and machine parts, causes the sensor assignment device to repeat the steps of generating and submitting a movement instruction, receiving sensor data, and determining sensor-specific degrees of correlation;

said sensor assignment device moving the machine parts using the distinct one of the plurality of actuators based on the sensor data.

2. The sensor assignment device of claim 1, wherein the degree of correlation determiner is configured to detect a temporal correlation between the submission of the movement instruction and the sensor data acquired by the subset of sensors.

3. The sensor assignment device of claim 1, wherein the movement instruction generator is configured to generate a movement instruction for the distinct one of the plurality of actuators to drive the distinct machine part such as to perform at least two different movements.

4. The sensor assignment device of claim 1, wherein the degree of correlation determiner is configured to detect a correlation between a requested movement pattern and an actual movement pattern actually performed by the distinct machine part and detected by the subset of sensors, said requested movement pattern being predetermined by one movement instruction or by a sequence of movement instructions.

5. The sensor assignment device of claim 1, wherein the degree of correlation determiner is configured to consider a type information when determining the degree of correlation, said type information defining a type of at least one of the sensors of the subset of sensors.

6. The sensor assignment device of claim 1, wherein the sensor assignment device is configured to broadcast a same movement instruction to all or to a subset of the plurality of actuators.

7. The sensor assignment device of claim 1, wherein the sensor assignment device is configured to broadcast movement instructions to different pluralities of actuators for narrowing down correlations between sensors and machine parts.

8. The sensor assignment device of claim 1, wherein the sensor assignment device includes a plausibility checker configured to check a plausibility of sensor assignments.

9. The sensor assignment device of claim 8, wherein the plausibility checker is configured to perform and evaluate a cross-correlation.

10. A method for assigning a sensor to a machine part moveable by an actuator, said method comprising:

transmitting a movement instruction to a distinct one of a plurality of actuators to move a distinct one of a plurality of machine parts;

acquiring sensor data based on movements of machine parts of three ceiling-mounted machines, by a subset of a plurality of sensors, with each machine having a pushrod as a machine part;

determining sensor-specific degrees of correlation between the acquired sensor data and the movement instruction;

assigning those sensors to the distinct machine part whose sensor-specific degrees of correlation exceed a predetermined threshold; and moving the machine parts by the distinct one of the plurality of actuators using the sensor data.

* * * * *